United States Patent [19]

Takahashi

[11] Patent Number: 5,657,311
[45] Date of Patent: Aug. 12, 1997

[54] DISC-SHAPED RECORDING MEDIUM WITH HUB STRUCTURE

[75] Inventor: Kenji Takahashi, Miyagi, Japan

[73] Assignee: Sony Corporation, Japan

[21] Appl. No.: 506,644

[22] Filed: Jul. 25, 1995

[30] Foreign Application Priority Data

Jul. 29, 1994 [JP] Japan .................................. 6-179318

[51] Int. Cl.⁶ .................................................. G11B 7/26
[52] U.S. Cl. .................................... 369/290; 369/282
[58] Field of Search .................................. 369/290, 282, 369/271, 270, 289; 360/133, 135

[56] References Cited

U.S. PATENT DOCUMENTS

| | | | |
|---|---|---|---|
| 4,910,624 | 3/1990 | Peeters | 369/282 |
| 5,289,456 | 2/1994 | Takahashi | 369/290 |
| 5,315,579 | 5/1994 | Hector et al. | 369/290 |
| 5,333,080 | 7/1994 | Ridinger et al. | 360/99.12 |

FOREIGN PATENT DOCUMENTS

| | | | |
|---|---|---|---|
| 60-93688 | 5/1985 | Japan | 369/290 |
| 60-209985 | 10/1985 | Japan | 360/135 |

Primary Examiner—Stuart S. Levy
Assistant Examiner—William R. Korzuch
Attorney, Agent, or Firm—Ronald P. Kananen

[57] ABSTRACT

A disc-shaped recording medium is provided in which the coupling state between the disc substrate and the hub structure may be positively maintained even after repeated mounting and dismounting operations of the recording medium from a recording/reproducing apparatus for prohibiting the hub structure from being disengaged from the disc substrate. The disc-shaped recording medium includes a disc substrate 2 having an information recording section for recording information signals and a center aperture 5, a hub structure 3 and a clamping member 4. The hub structure has a magnetic plate 6 magnetically clamped to a disc table by a magnetic attracting means and an outer rim fitting member 9 slightly larger in diameter than the inner diameter of the center aperture 5 of the disc substrate 2 having plural elastically flexible engagement pieces 13 for being unified to the outer rim of the magnetic plate 6. The clamping member 4 is formed of a spring material so as to exhibit elasticity in the direction along its thickness and is of a diameter slightly larger than the inner diameter of the center aperture 5 of the disc substrate 2. The clamping member is integrally formed with mating engagement pieces 23 adapted for being engaged with the engagement pieces 13 of the outer rim fitting member 9.

15 Claims, 10 Drawing Sheets

DISC-SHAPED RECORDING MEDIUM WITH HUB STRUCTURE

BACKGROUND OF THE INVENTION

This invention relates to a disc-shaped recording medium on which information signals are pre-recorded or which enables information signals to be recorded thereon, such as an optical disc or a magneto-optical disc. More particularly, it relates to a hub structure of the disc-shaped recording medium which permits the recording medium to be chucked on a rotational driving device for the recording medium. In the description to follow, such a disc-shaped recording medium is referred to simply as an optical disc.

The optical disc is a recording medium on which desired information signals, such as music signals or picture signals, are pre-recorded at a high recording density, or which permits such information signals to be recorded thereon at a high recording density. An optical disc of an extremely small diameter, such as 64 mm or less, has been put to practical use. When loaded on the recording/reproducing apparatus, the optical disc is run in high-speed rotation by being loaded in its center portion on a disc rotating device. While the optical disc is being run in high-speed rotation, it is irradiated with a laser beam outgoing from an optical pickup device so that information signals recorded on an information signal recording section formed on its major surface may be reproduced. If the optical disc is a recordable disc, an external magnetic field, modulated in accordance with information signals to be recorded, is applied by an external magnetic field generating device on the optical disc, while a laser light outgoing from an optical pickup device is radiated on the information signal recording section for recording desired information signals.

In order for the laser light to be accurately radiated on fine recording tracks of the information signal recording section of the optical disc rotated at an elevated velocity, the optical disc is reliably unified to a disc table of the disc rotating device, and is chucked in a state in which it has its center of rotation positioned highly accurately at an axial center of the disc table. The conventional chucking system for the optical disc is a so-called magnet chucking system which enables the recording/reproducing apparatus to be reduced in thickness and which exploits the force of magnetic attraction of a magnet positioning and chucking the optical disc with high accuracy.

That is, with the magnet chuck system, a magnet is arranged on a disc table, and a magnetic plate, constituted as a metal plate, is mounted in a center aperture of the optical disc. Thus, when loaded on the recording/reproducing apparatus, the optical disc has its magnetic plate attracted by the magnet so that the optical disc is unified with the disc table and run in high-speed rotation by the disc rotating device.

In FIGS. 9 to 11, there is shown a conventional optical disc 100 to which the above-described magnet chuck system is applied and which is made up of a disc substrate 101 and a hub structure 103. The disc substrate 101 is made up of a pair of disc-shaped transparent substrates 101A, 101B formed of glass or transparent synthetic resin, such as polycarbonate. One 101A of the transparent substrates has a circumferentially extending information signal recording section on its surface to be bonded to the other transparent substrate 101B. The transparent substrate 101B is bonded to the transparent substrate 101A for covering the information recording section with the aid of e.g., a hot melt, with the major surface of the transparent substrate 101B operating as an information signal readout surface.

The transparent substrates 101A, 101B are formed at the center regions with coaxial center openings 102A, 102B, respectively. When the transparent substrates 101A, 101B are joined together, the center apertures 102A, 102B together define a center aperture 102, in which is mounted a hub structure 103.

The hub structure 10S is made up of a disc-shaped magnetic plate 104 for magnet clamping, formed of a magnetic material, such as metal, an inner rim fitting member 106 unified to a center opening 105 formed in the magnetic plate 104 and an outer rim fitting member 107 unified to an outer rim of the magnetic plate 104. The magnetic plate 104 is formed as a disc slightly smaller in diameter than the center aperture 102 of the disc substrate 101.

The inner rim fitting member 108 is formed of a synthetic resin material having high resistance against abrasion and high lubricating properties, such as polyacetal resin or fluorine-containing polycarbonate resin, and is unified to the center opening 105 of the magnetic plate 104 by outsert molding. The inner rim fitting member 108 is in the form of a ring having a center opening 108 operating as a spindle receiving hole passed through by a spindle shaft of a rotating device of the recording/reproducing apparatus.

The outer rim fitting member 107 is formed of a synthetic resin material capable of transmitting UV rays and exhibiting superior adhesiveness with respect to the disc substrate 101, such as a transparent polycarbonate resin which is the same material as that used for the disc substrate 101. The outer rim fitting member 107 is formed as a ring-shaped member unified by outsert molding to the outer rim of the magnetic plate 104. In this case, the outer rim fitting member 107 is outsert-molded so that plural upstanding pieces formed on the outer rim of the magnetic plate 104 are molded in the outer rim fitting member 107 has its outer shape and size larger than the diameter of the center opening 102.

The above-described hub structure 103 is combined with the disc substrate 101 with the center aperture 102 of the disc substrate 101 precisely centered with respect to the spindle receiving opening 108 of the inner rim fitting member 106, as shown in FIG. 10. The portion of the major surface of the disc substrate 101 combined with the hub structure 103, which is located around the outer rim of the center aperture 102, adapted to be bonded to the major surface of the outer rim fitting member 107, is coated with an adhesive, such as UV curable adhesive. The UV curable adhesive is irradiated with UV rays and thereby cured for unifying the disc substrate 101 and the hub structure 103 together for completing the optical disc 100.

The optical disc 100 is rotatably housed within the inside of a disc cartridge casing made up of an upper half and a lower half which are in the form of shallow square-shaped saucers and which are abutted and bonded to each other. The disc cartridge casing has a recording/reproducing aperture which permits the information recording section of the disc substrate 101 to be exposed to the outside across its inner and outer rims and via which an optical pickup unit of the recording/reproducing apparatus is intruded to a position facing the disc. The recording/reproducing aperture is usually closed by a shutter member adapted for being moved along the major surface of the disc cartridge casing. The mid portion of the disc cartridge casing has a disc table intruding opening via which the magnetic plate 104 constituting the hub structure 103 of the optical disc 100 is exposed to the outside.

When the disc cartridge is loaded on a disc cartridge loading section of the recording/reproducing apparatus, the disc table of the disc rotating device is intruded via the disc table intruding opening into the inside of the disc cartridge so that a magnet provided on the disc table is magnetically attracted by the magnetic plate 104 to effect magnet chucking. When the shutter member is moved for opening the recording/reproducing aperture, the optical pickup device is intruded into the inside of the disc cartridge. The optical disc 100, thus magnet chucked, is rotated at an elevated velocity by the disc rotating device, so that information signals are recorded on or reproduced from the information recording section by the operation of the optical pickup device.

When the disc cartridge is to be ejected, the magnetic plate 104 of the hub structure 103 is disengaged from the magnet of the disc table so as to be taken out from the disc cartridge loading section of the recording/reproducing apparatus. The force of disengaging the magnetic plate 104 from the magnet operates in such direction that the disc substrate 101 and the outer rim fitting member 107 of the hub structure 103, which are bonded together by the adhesive, tend to be separated from each other.

Thus, by repeating the operation of disengaging the optical disc 100 from the disc table of the disc rotating device, the bonding portion of the magnetic plate 104 to the disc substrate 101 is subjected to a load of separating the optical disc from the disc table thus deteriorating the adhesive to cause the hub structure 103 to be detached from the disc substrate 101.

If, while the disc cartridge is loaded on the recording/reproducing apparatus, the hub structure is detached from the disc substrate 101, it remains attracted to the magnet of the disc table after the disc cartridge is taken out of the recording/reproducing apparatus. When a normal disc cartridge is loaded on the recording/reproducing apparatus, it is impossible to chuck the optical disc because the hub structure detached from the previous optical disc remains attracted to the disc table.

SUMMARY OF THE INVENTION

It is therefore an object of the present invention to provide a disc-shaped recording medium in which, on repeated optical disc detachment operations from the recording/reproducing apparatus, the state bonding of the disc substrate to the hub structure is positively maintained so that the hub structure is positively prohibited from being disengaged from the disc substrate.

According to the present invention, there is provided a disc-shaped recording medium including a disc substrate having an information signal recording section for recording information signals and having a center aperture, a hub structure having a magnetic plate magnetically clamped to a disc table of a recording/reproducing apparatus by magnetic attracting means and an outer rim fitting member of a synthetic resin having a diameter slightly larger than the inner diameter of the center aperture of the disc substrate. The outer rim fitting member is integrally combined with the outer periphery of the magnetic plate. The outer rim fitting member has a plurality of elastically flexible engagement pieces at a position facing the center aperture. The hub structure is mounted on the disc substrate by being fitted in the center aperture from one of the major surfaces of the disc substrate and by having the inner surface of the outer periphery of the outer rim fitting member coupled to the outer periphery of the center aperture. The recording/reproducing apparatus also has a clamping member formed of an elastic material as a ring of a diameter slightly larger than the inner diameter of the center aperture of the disc substrate so as to exhibit elasticity along its thickness. The clamping member is integrally formed with a plurality of engagement pieces adapted for being engaged with the elastically flexible engagement pieces of the outer rim fitting member. The clamping member is assembled from the opposite major surface of the disc substrate by being guided by positioning means for the outer rim fitting member. The hub structure and the clamping member are unitarily assembled together via the positioning means by engagement of the elastically flexible engagement pieces of the outer rim fitting member with the mating engagement pieces provided in the clamping member with the clamping member being then flexed elastically to a small extent along its thickness.

A ring-shaped inner rim fitting member of synthetic resin of high lubricating properties and high resistance against abrasion, having a spindle receiving hole passed through by a spindle shaft of a disc rotating device of a recording/reproducing apparatus, is unified to the magnetic plate of the hub structure on the side of the outer rim of the center aperture.

The positioning means playing the role of guide means when assembling the hub structure and the clamping member in position to each other includes plural positioning recesses and plural positioning protrusions formed in the outer rim fitting member and the clamping member in registration with each other.

The positioning recesses are formed at equiangular positions around the center aperture of the outer rim fitting member and the positioning protrusions are formed by bending at at least three different circumferential points around the center aperture of the clamping member.

A plurality of mounting openings formed facing the center aperture of the outer rim fitting member, a plurality of screw-inserting holes formed in the clamping member in registration with the mounting apertures and a plurality of set screws introduced via the screw-inserting holes into the mounting openings make up second coupling means.

With the above-described disc-shaped recording medium according to the present invention, the hub structure and the clamping member, assembled together by positioning means, are integrally coupled to each other for clamping the disc substrate in-between by engagement between the elastically flexible engagement pieces of the outer rim fitting member and mating engagement pieces of the clamping member, with the clamping member being then elastically flexed to a small extent in a direction along its thickness. The hub structure and the clamping member may be combined together by a so-called one-touch operation extremely easily with the disc substrate being securely clamped in-between so that the risk of the hub structure being inadvertently disengaged from the disc substrate may be avoided positively.

On the other hand, with the disc-shaped recording medium according to the present invention, the inner rim fitting member unified to the outer rim of the center aperture of the magnetic plate has its spindle receiving hole passed through by a spindle shaft of the disc rotating device of the recording/reproducing apparatus, whereby the disc-shaped recording medium is chucked in position with respect to the disc rotating device. Since the inner rim fitting member exhibits resistance against abrasion and lubricating properties, it causes the spindle shaft to be smoothly fitted in the spindle receiving hole when the disc-shaped recording medium is chucked with respect to the disc rotating device, while maintaining optimum fitting state between the spindle shaft opening and the spindle shaft.

In addition, with the disc-shaped recording medium according to the present invention, the hub structure and the clamping member are assembled together in such a manner that the relative engagement position between the engagement pieces of the outer rim fitting member and the mating engagement pieces of the clamping member is adjusted by engagement between the positioning recesses and the mating engagement protrusions, so that the disc substrate is clamped positively. Since the plural positioning recesses are provided at equiangular positions around the center aperture of the outer rim fitting member, while the positioning protrusions are formed by bending at at least three circumferentially different points of the clamping member around the center aperture of the clamping member, the clamping member may be simplified in structure, while the hub structure and the clamping member may be positioned accurately by a simplified operation.

Furthermore, with the disc-shaped recording medium according to the present invention, the assembled state between the hub structure and the clamping member by the engagement pieces of the outer rim fitting member with the mating engagement pieces of the clamping member with the disc substrate being clamped positively in-between is reinforced by the second coupling means, whereby the hub structure may be positively prohibited from being detached from the disc substrate.

DETAILED DESCRIPTION OF THE PREFERRED EMBODIMENTS

Figure 1:
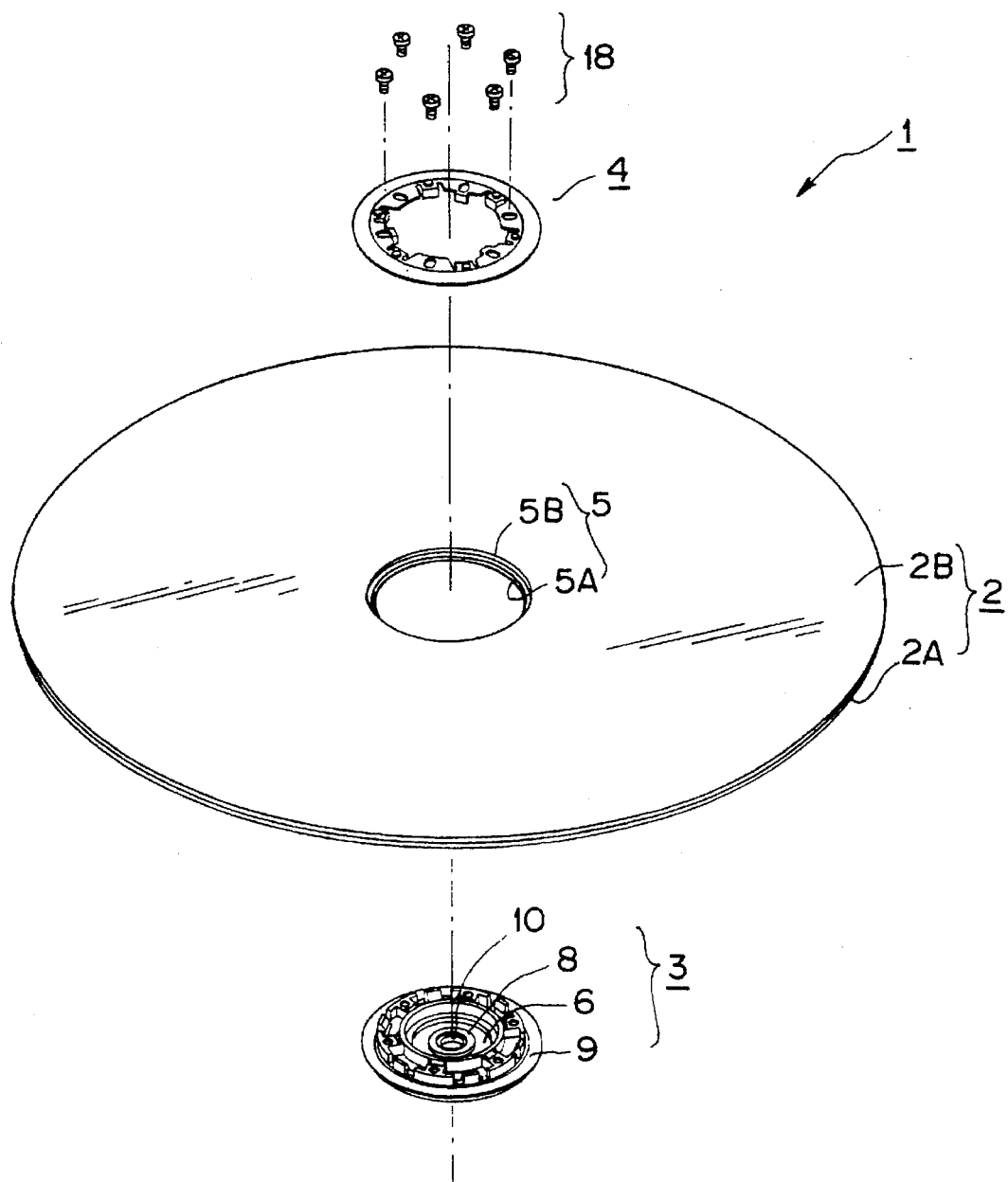
FIG. 1 is a perspective view showing an optical disc in which the assembled state of the hub structure and the clamping member is reinforced by a set screw as second connecting means.
Figure 2:
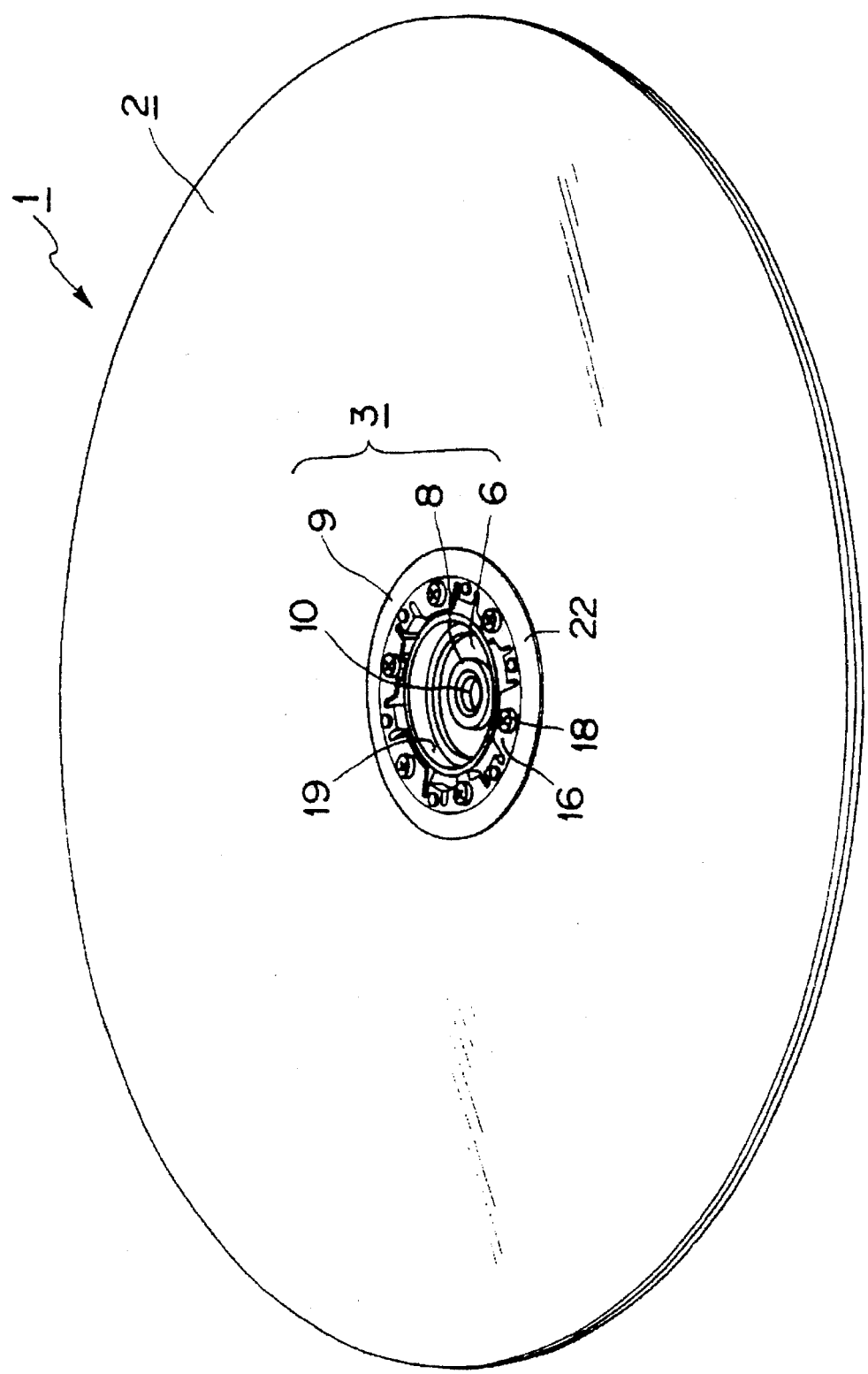
FIG. 2 is a perspective view of the hub structure.
Figure 3:
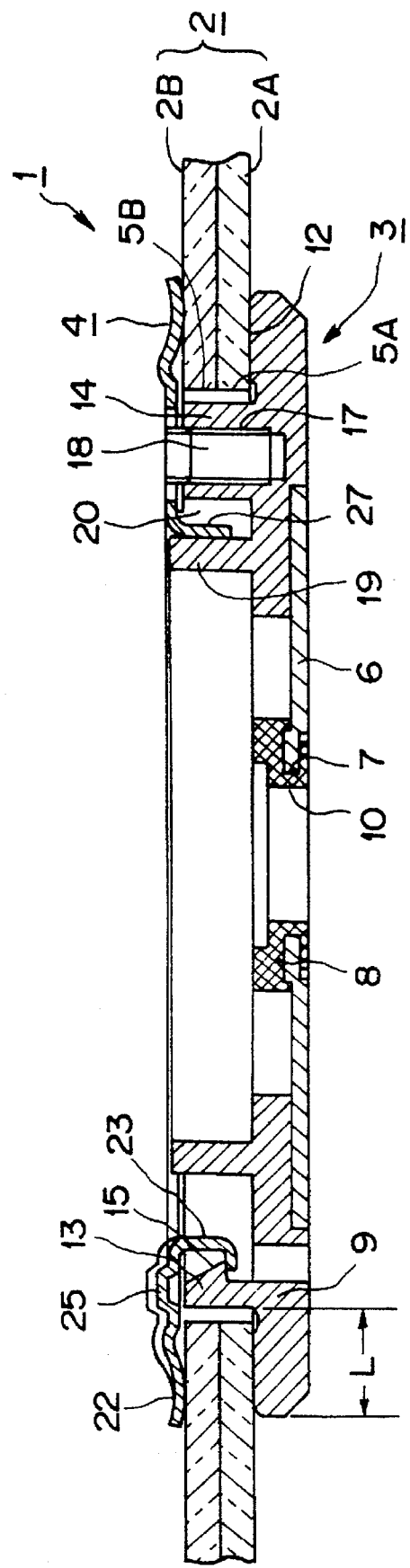
FIG. 3 is a schematic longitudinal cross-sectional view for illustrating the assembling operation of the hub structure assembled to the disc substrate and a clamping member in the course of assembling of the optical disc.
Figure 4:
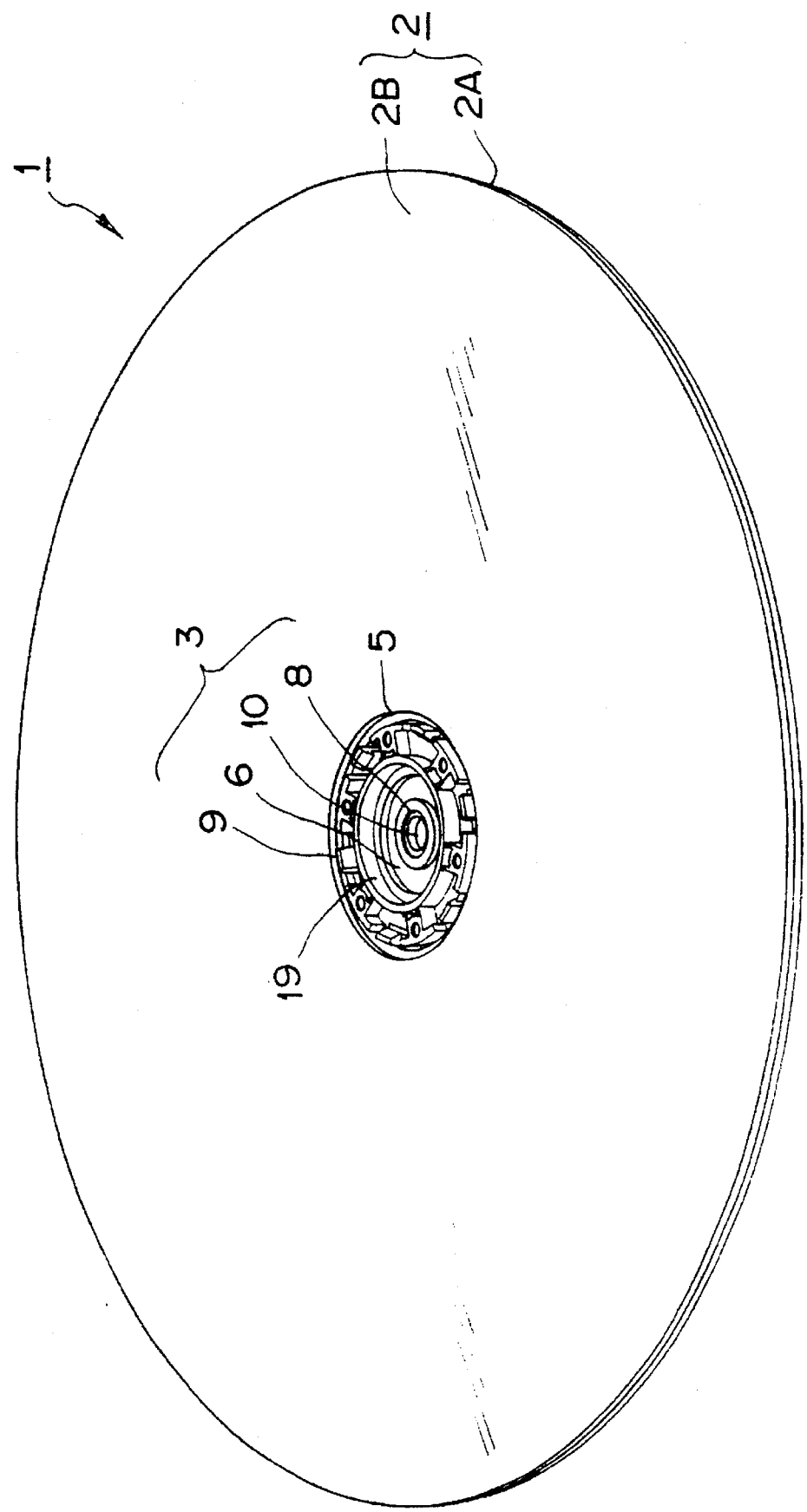
FIG. 4 is an exploded perspective view of an optical disc as an embodiment of a disc-shaped recording medium according to the present invention.
Figure 5:
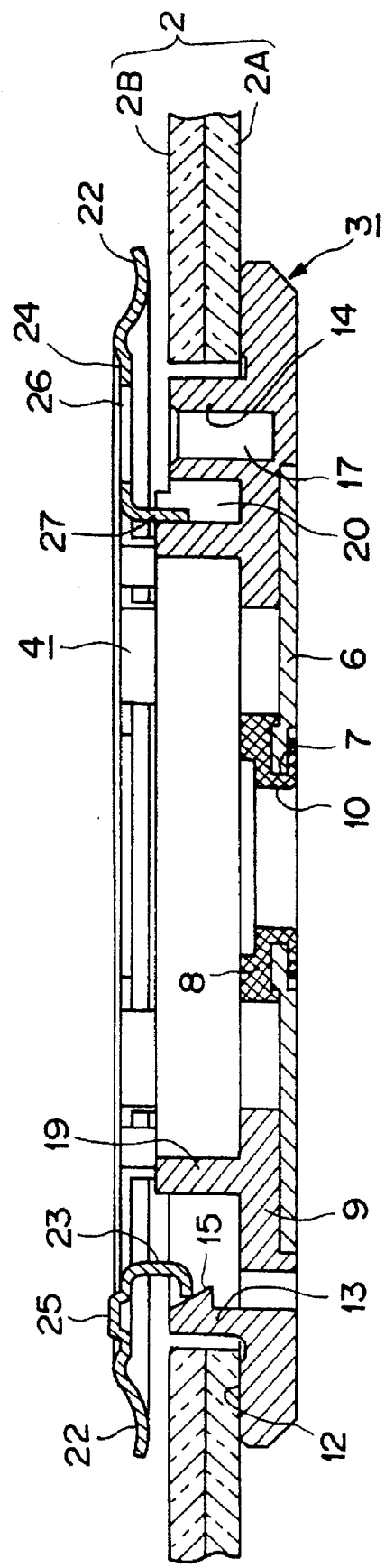
FIG. 5 is a schematic cross-sectional view of the optical disc shown in FIG. 1.
Figure 6:
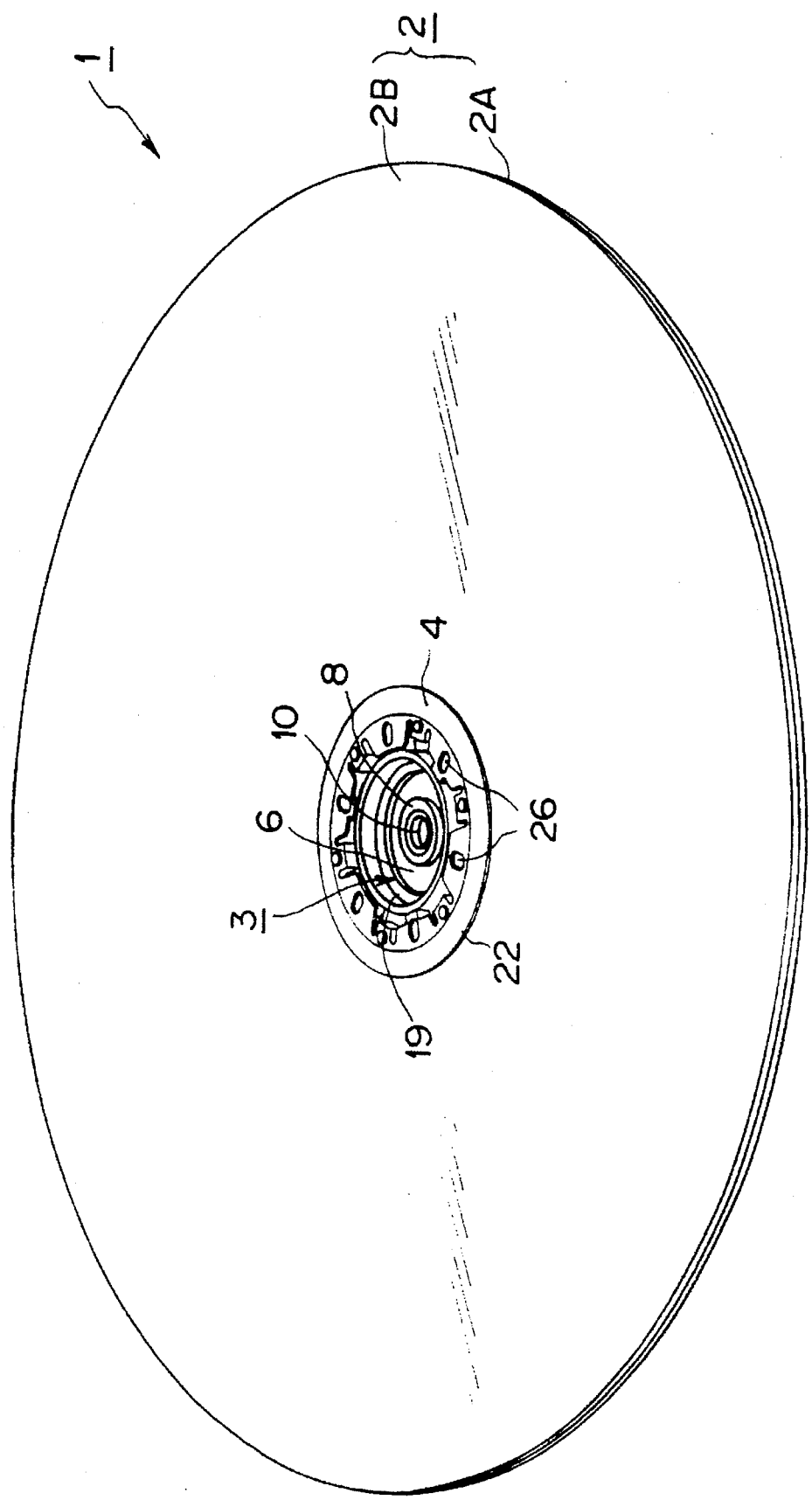
FIG. 6 is a perspective view of the optical disc shown in FIG. 1.

Referring to the drawings, preferred embodiments of the present invention will be explained in detail. An optical disc 1 of the present embodiment is made up of a disc substrate 2, a hub structure 3 and a clamping member 4. Similarly to the disc substrate 101 of the conventional optical disc 100, the disc substrate 2 is made up of a pair of disc-shaped transparent disc substrates 2A, 2B formed by glass plates or transparent synthetic resin, such as polycarbonate. One 2A of the disc substrates has a circumferentially extending information signal recording section on its surface to be bonded to the other disc substrate 2B. The disc substrate 2B is bonded to the disc substrate 2A for covering the information recording section with the aid of e.g., a hot melt, with the major surface of the disc substrate 2B operating as an information signal readout surface.

The disc substrates 2A, 2B are formed at the center regions with coaxial center openings 5A, 5B, respectively. When the disc substrates 2A, 2B are joined together, the center apertures 5A, 5B together define a center aperture 5, in which is mounted a hub structure 3 which will be explained subsequently. The present invention is not limited to the disc substrate made up of the disc substrates 2A, 2B bonded together as described above, but may be applied to a unitary transparent disc substrate.

The hub structure 3 is made up of a disc-shaped magnetic plate 6 for magnet clamping, formed of a magnetic material, such as metal, an inner rim fitting member 8 unified to a center opening 7 formed in the magnetic plate 6 and an outer rim fitting member 9 unified to an outer rim of the magnetic plate 6.

Figure 8:
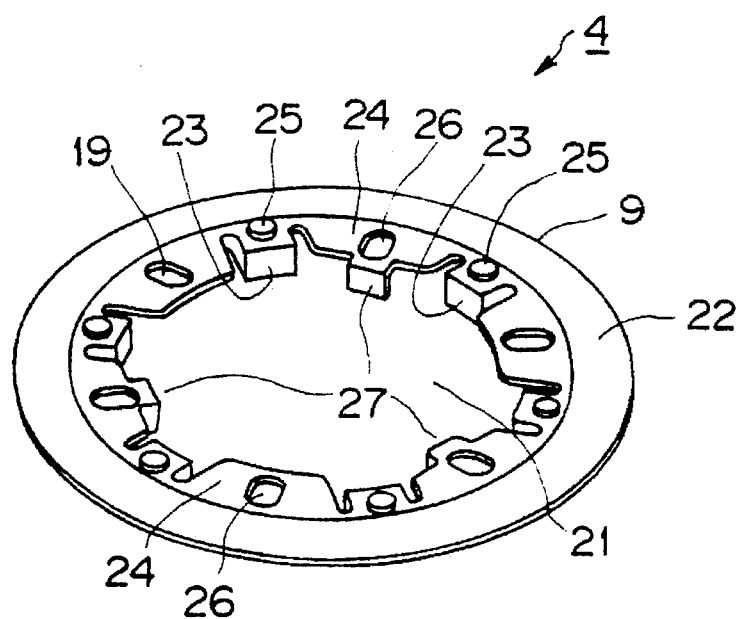
FIG. 8 is a perspective view showing a clamping member.

The magnetic plate 6 is formed as a disc slightly smaller in diameter than the center aperture 5 of the disc substrate 2. The magnetic plate 6 is crank-shaped in cross-section, with the rim of the center opening 7 being convex-shaped on one major surface of the magnetic plate 6, as shown in FIG. 8. The magnetic plate 6 is also formed in the vicinity of the outer rim thereof with plural segmented upstanding pieces, not shown.

Similarly to the inner rim fitting member 106 of the conventional optical disc 101, the inner rim fitting member 8 is formed of a synthetic resin material having high resistance against abrasion and high lubricating properties, such as polyacetal resin or fluorine-containing polycarbonate resin, and is unified to the center opening 7 of the magnetic plate 6 by outsert molding. In this case, the inner rim fitting member 8 is unified to the magnetic plate 6 with sufficient mechanical strength by being outsert-molded for covering a raised portion of the crank shape formed on the rim of the center opening 7 of the magnetic plate 6. The inner rim fitting member 8 is in the form of a ring having a center opening 10 operating as a spindle receiving hole passed through by a spindle shaft of a rotating device of the recording/reproducing apparatus.

Similarly to the outer rim fitting member 107 of the conventional optical disc 101, the outer rim fitting member 9 is formed of a synthetic resin material capable of transmitting UV rays and exhibiting superior adhesiveness with respect to the disc substrate 2, such as a transparent polycarbonate resin which is the same material as that used for the disc substrate 2, such as polycarbonate resin. The outer rim fitting member 9 is formed as a ring-shaped member unified by outsert molding to the outer rim of the magnetic plate 6. In this case, the outer rim fitting member 9 is outsert-molded for so that plural upstanding pieces formed on the outer rim of the magnetic plate 6 are molded in the outer rim fitting member 9.

The outer rim fitting member 9 has its outer shape and size larger than the diameter of the center opening 5 and slightly smaller than the innermost rim of the information recording section of the first disc substrate 2A configured to record information signals therein. An outer peripheral annular wall 11 is integrally formed at a pre-set spacing L towards the inner side from its outer rim. The outer peripheral annular wall 11 is formed integrally with the outer rim fitting member 9 and has an inner diameter slightly smaller than the inner diameter of the center opening 5 of the disc substrate 2 and a vertical length substantially equal to the thickness of the disc substrate 2. A flat ring-shaped area 12 of a width L, defined between the outer peripheral annular wall 11 and the outer rim portion of the outer rim fitting member 9, is configured as a bonding surface with resect to the disc substrate 2, as will be explained subsequently.

The outer peripheral annular wall 11 is divided by 12 vertically extending grooves into 12 arcuate blocks. These arcuate blocks are made up of two block groups, namely a first block group of arcuate blocks 13 and a second block group of arcuate blocks 14 and together delimit the outer peripheral annular wall 11.

The arcuate blocks 13 of the first block group, each having a smaller circumferential length, has wedge-shaped protrusion 15 (15A to 15F) having an inclined surface and a step contiguous to the inclined surface and is designed to be elastically flexible along its thickness. The inclined surface is formed on the inner peripheral surface of each arcuate block 13 for extending inwardly towards its bottom. The arcuate blocks 13 of the first block group make up engagement pieces engaged by the clamping member 4 as later explained.

The arcuate blocks 14 of the second block group, each having a larger circumferential length, each have a block-shaped protrusion 16 on its inner peripheral side. Each block-shaped protrusion 16 is formed with a vertically extending blind hole 17. The arcuate blocks 14 of the second block group, thus arranged, operate as additional mounting members by securing the clamping member 4, mounted via engagement pieces 13, with the aid of set screws 18 as later explained. That is, these blind holes 17 are formed as prepared holes engaged by the set screws 18.

Although the first block group 13 and the second block group 14 are each made up of six blocks, the number of blocks making up the first or second block group may be arbitrarily set in dependence upon the outer diameter or strength of the hub structure 3.

At an inner side of the block-shaped protrusions 16 of the second block group 14, the outer rim fitting member 9 is formed with an inner peripheral annular wall 19 concentrically with the outer peripheral annular wall 11. The inner peripheral annular wall 19 has its vertical dimension slightly larger than the thickness of the disc substrate 2 and delimits vertically extending recesses 20 between it and the block-shaped protrusions 16. These engagement recesses 20 operate as guides for mounting the clamping member 4 as later explained.

The hub structure 3 is constructed by unifying the inner rim fitting member 8 and the outer rim fitting member 9 to the magnetic plate 6 by outsert molding, aa described above. If the double outsert molding method, that is the so-called two-color molding method or double-molding method, consisting in simultaneous molding using different sorts of the resin material, is employed, the inner rim fitting member 8 and the outer rim fitting member 9 may be outsert molded simultaneously with respect to the magnetic plate 6.

Figure 9:
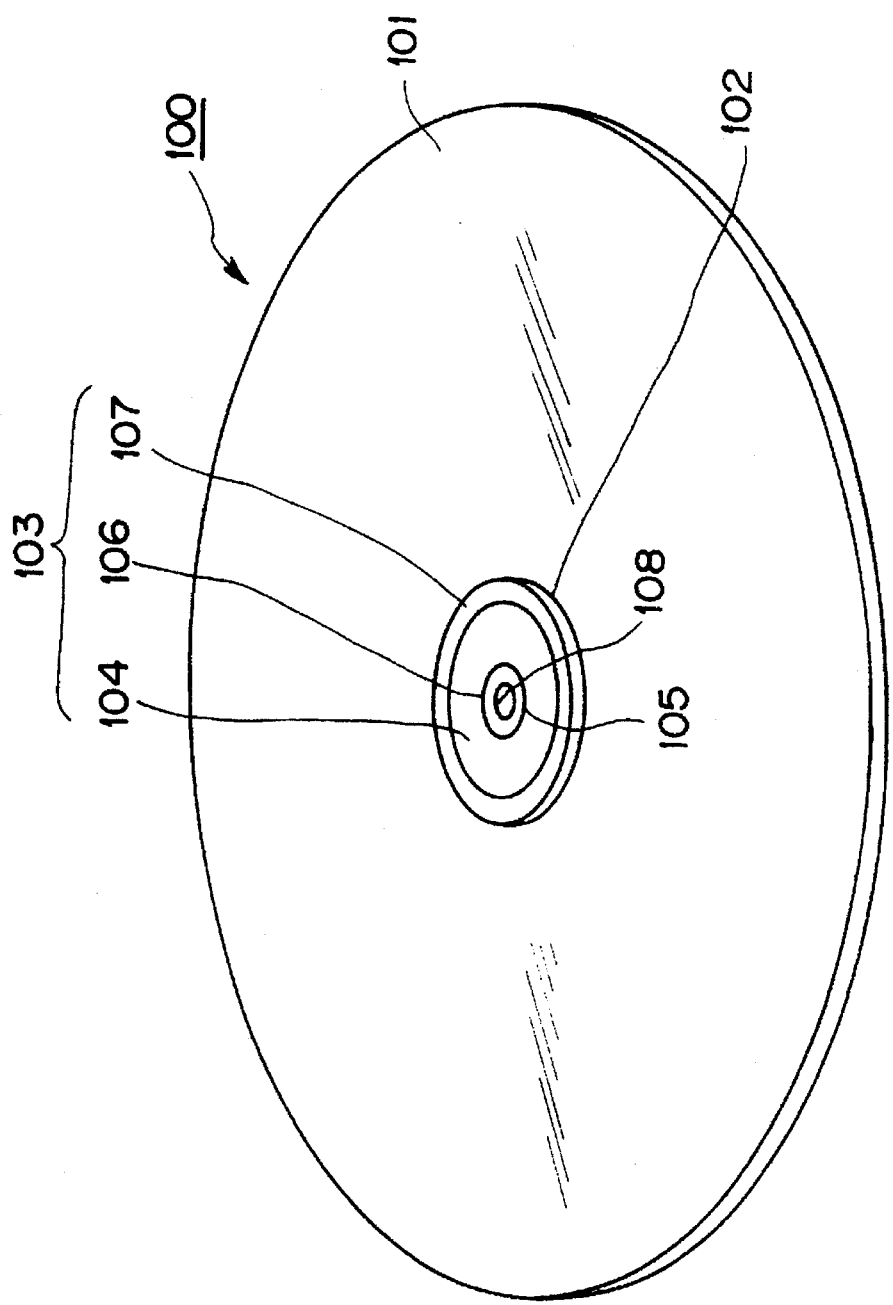
FIG. 9 is a perspective view showing a conventional disc-shaped recording medium.
Figure 10:
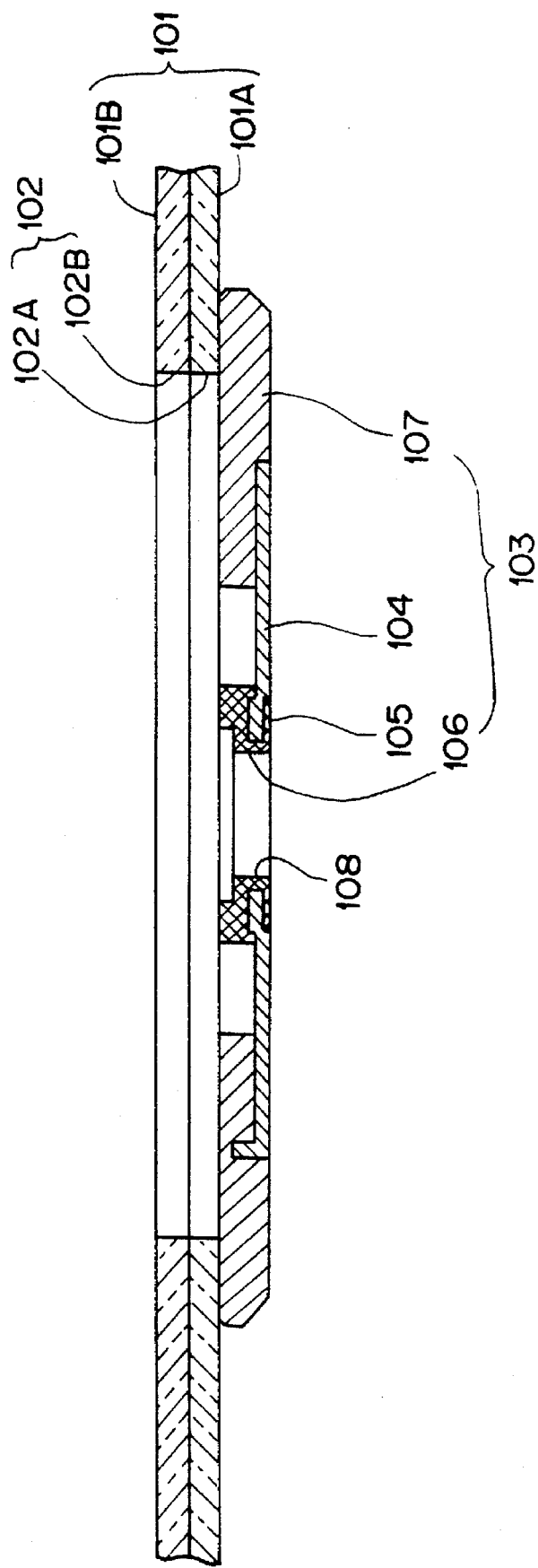
FIG. 10 is a schematic longitudinal view of the conventional disc-shaped recording medium.
Figure 11:
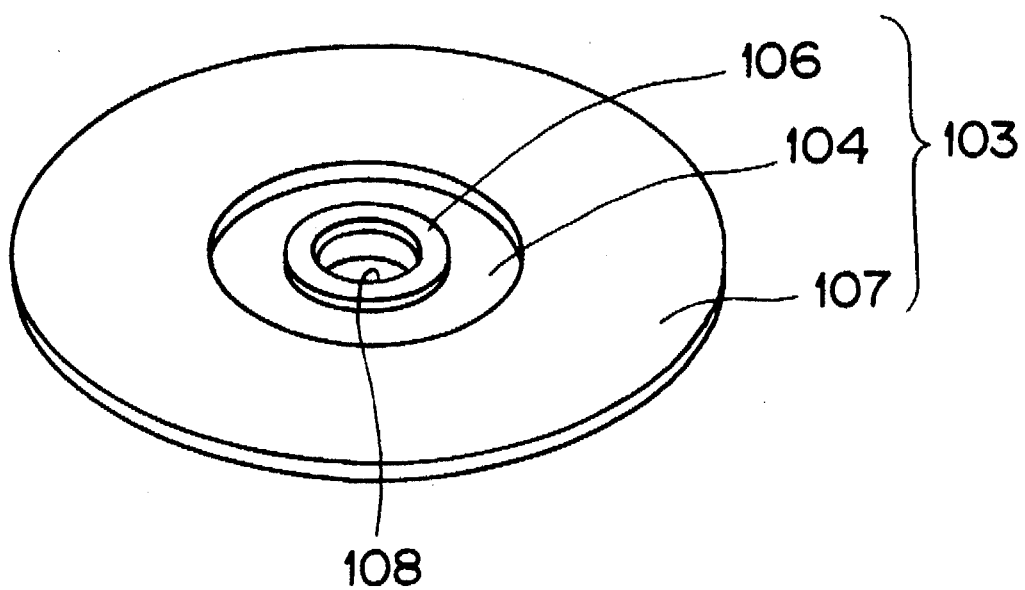
FIG. 11 is a perspective view of a hub structure provided on the conventional disc-shaped recording medium.

The clamping member 4 is formed as a substantially ring-shaped member by punching or bending a starting material, that is an elastic metal sheet of a small thickness, such as SUS 304 spring plate, with the aid of a press working device, as shown in FIG. 9. The clamping member 4 has an outer diameter larger than the inner diameter of the center opening 5 of the disc substrate 2 and slightly smaller than the diameter of the innermost region of the information signal recording section formed in the first disc substrate 2A. The clamping member 4 has the inner diameter of a center opening 21 thereof slightly larger than the outer diameter of the inner peripheral annular wall 19 of the outer rim fitting member 9.

An outer rim portion of the clamping member 4, more specifically, an outer rim portion 22 thereof corresponding to an area between its outer peripheral edge and the inner peripheral edge of the center aperture 5 of the disc substrate 2, is formed as an irregular surface having a corrugated cross-section so as to be elastically flexible along its thickness. Due to this shape of the irregular surface, the outer rim portion 22 exhibits elasticity in a direction along its thickness. Extending from the outer rim portion 22 towards the inner rim of the center opening 21 are formed six engagement pieces 23 and screwing portions 24 in adjacency to one another. These engagement pieces 23 are used when mounting the clamping member 4 on the hub structure 3.

That is, the engagement pieces 23 are positioned in registration with the wedge-shaped engagement pieces 13 formed in the outer rim fitting member 9 of the hub structure 3. These engagement pieces 23 are each formed in the cross-sectional shape of a letter U by bending the foremost part of a horizontal section extending from the inner rim of the outer rim portion 22 towards the center opening 21 downwards and then towards outside parallel to the horizontal section. The engagement pieces 23 are engaged with the engagement pieces 13 of the outer rim fitting member 9 for securely mounting the clamping member 4 on the hub structure 3 as will be explained subsequently. The vertical size of the engagement pieces 23 and the engagement pieces 13 of the outer rim fitting member 9 are selected so that, when the hub structure 3 and the clamping member 4 are assembled together, the vertical facing distance between the hub structure 3 and the clamping member 4 is slightly smaller than the thickness of the disc substrate 2.

A substantially hemispherical dowel 25 is formed by extrusion molding on the upper surface of the horizontal section of the engagement piece 28. This dowel 25 operates as a portion thrust by a mounting jig, not shown, when mounting the clamping member 4 on the hub structure 3. The screwing portions 24 are formed in registration with the block-shaped protrusions 16 formed in the outer rim fitting member 9 of the hub structure 3. Each screwing portion 24 has a screw inserting hole 28 in registration with the prepared hole 17 in the block-shaped protrusion 16 for being engaged by the set screw 18.

Each screwing portion 24 has a positioning lug 27 by bending its distal end portion. The positioning lug 27 is engaged with the engagement recess 20 formed in the outer rim fitting member 9 during mounting the clamping member 4 on the hub structure 3 in order to achieve the function of position registration between the clamping member 4 and the hub structure 3. Thus it suffices for the positioning lug 27 to effect position registration between the clamping member 4 and the hub structure 3 at at least three circumferential positions, so that the positioning lug 27 is formed at every other screwing portion 24. Of course, the positioning lugs 27 may be formed at all of the six screwing portions 24, although this correspondingly complicates the shape of the clamping member 4.

The optical disc 1 is completed by assembling the above-described disc substrate 2, hub structure 3 and the clamping member 4. The disc substrate 2 and the hub structure 3 are bonded together using an adhesive, such as a UV curable adhesive. That is, the UV curable adhesive is applied to the entire region between the center aperture 5 and the innermost portion of the information recording region of the first disc substrate 2A. The disc substrate 2 and the hub structure 3 are centered relative to each other so that the center aperture 5 and the spindle receiving hole 10 are centered relative to each other, and are stacked together in this state. UV rays are then radiated to the portions coated with the adhesive.

Figure 7:
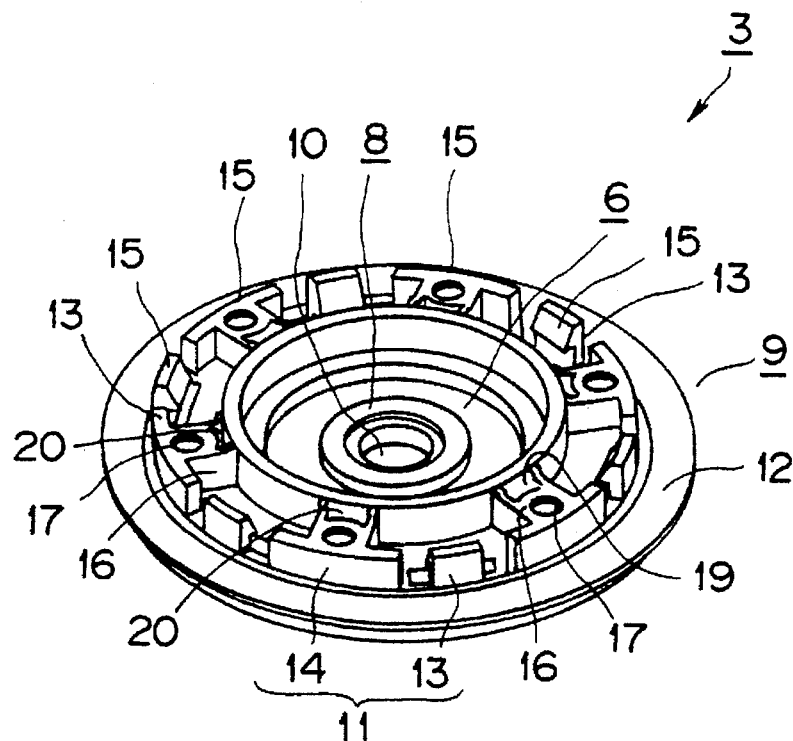
FIG. 7 is a perspective view for illustrating the hub structure bonded to and mounted on the disc substrate in the course of assembling of the optical disc.

The UV curable adhesive, coated on the first disc substrate 2A, is cured by irradiation with UV rays, whereby the disc substrate 2 and the hub structure 3 are securely bonded to each other as shown in FIG. 7. The clamping member 4 is assembled on the thus unified disc substrate 2 and hub structure 3 from the side of the disc substrate 2B.

With the positioning lug 27 formed by bending the screwing portions 24 being positioned facing the engagement recesses 20 of the outer rim fitting member 9 of the hub structure 3, the clamping member 4 is thrust into the hub structure 3 by a mounting jig, not shown. The clamping member 4 is thrust into the hub structure 3 with the positioning lugs 27 engaged in the recesses 20 operating as guides. The clamping member 4 is intruded into the inside of the hub structure 3 whilst the engagement pieces 13 of the outer rim fitting member 9 positioned facing the engagement pieces 23 are resiliently flexed towards the outer periphery. When the distal ends of the engagement pieces 23 of the clamping member 4 travel past the wedge-shaped protrusion 16 so as to be engaged with the engagement pieces 13, the engagement pieces 13 are restored to their initial state from the resiliently flexed state. By engagement of the engagement pieces 23 of the clamping member 4 with the engagement pieces 13 of the outer rim fitting member 9 at the six points on the inner periphery of the clamping member 4, the clamping member is securely assembled with the outer rim fitting member 9, that is the hub structure 3.

The mounting jig used for securely mounting the hub structure 3 and the clamping member 4 together has a ring-shaped operating portion having an outer diameter substantially equal to the outer periphery of the clamping member 4, this operating portion acting on the dowel 25 formed on the outer periphery of the clamping member 4. Thus the clamping member 4 may have its dowel 25 formed on its outer peripheral surface in registration with the engagement pieces 23 thrust efficiently into engagement with the engagement pieces 13 of the outer rim fitting member 9.

The vertical facing distance between the hub structure 3 and the clamping member 4 is set so as to be slightly smaller than the thickness of the disc substrate 2 in the assembled state of the hub structure and the clamping member, as stated hereinabove. Thus the clamping member 4 is caused to bear against the major surface of the disc substrate 2B whilst the outer rim portion 22 having a corrugated cross-sectional shape is flexed elastically. The elastic force of the clamping member 4 operates for thrusting the hub structure 3 against the major surface of the first disc substrate 2A. Thus the disc substrate 2 is securely clamped between the hub structure 3 and the clamping member 4 so that the hub structure 3 is positively prohibited from being disengaged even on application of a force of disengaging the hub structure 3 from the disc substrate 2.

Meanwhile, in a recording/reproducing apparatus employing an optical disc for professional use, having a large size and relatively heavy weight, the magnetic plate 6 of the hub structure 3 is configured to be attracted by a strong magnetic force for loading the optical disc 1 on the disc table of the disc rotating device in a more stable state. An optical disc used frequently is frequently mounted on and dismounted from the disc rotating device. It is also feared that the engagement pieces 13 of the outer rim fitting member 9 and the engagement pieces 23 of the clamping member 4 of the optical disc used for mounting the hub structure 3 and the clamping member 4 together undergo elastic fatigue wit lapse of time.

For obviating such inconvenience, the coupling means for mounting the hub structure 3 and the clamping member 4 together in the optical disc 1 of the present embodiment is augmented, if need be, by second coupling means which is used in addition to the first coupling means implemented by the engagement pieces 13 of the outer rim fitting member 9 and the engagement pieces 23 of the clamping member 4. That is, with the optical disc 1, after the hub structure 3 and the disc substrate 2 are assembled together for clamping the disc substrate 2 in-between by the above-described operation, the set screws 18 are screwed into the prepared holes 17 in the outer rim fitting member 9 via the screw inserting holes 28 in the clamping member 4.

The set screws 18 are screwed as the prepared holes 17 are tapped by so-called self-tapping for tightly connecting the screwing portions 24 of the clamping member 4 onto the block-shaped protrusions 16 of the outer rim fitting member 9. Since the hub structure 3 and the clamping member 4 may be coupled to each other by the set screws 18 as well, there is no risk of the hub structure 3 being disengaged from the disc substrate 2.

The above-described optical disc 1 is rotatably housed within the disc cartridge casing made up of upper and lower halves in the form of square shallow saucers abutted and coupled to each other. Of course, the disc cartridge is the same as the conventional disc cartridge with the optical disc 1 housed therein. When the disc cartridge is loaded on the disc cartridge loading section of the recording/reproducing apparatus, the magnet provided on the disc table of the disc rotating device attracts the magnetic plate 6 of the hub structure 3 to effect magnet chucking of the disc cartridge.

When the shutter member is moved by a shutter driving member of the recording/reproducing apparatus for opening the recording/reproducing aperture, the optical pickup device is intruded via the recording/reproducing aperture to a position facing the information signal recording section of the optical disc 1. This sets the disc cartridge for recording/ reproduction. If then the recording/reproducing apparatus is actuated, the optical disc 1 as it is magnetically chucked is run in high-speed rotation by the disc rotating device for reproducing the information signals recorded on the information signal recording section or recording information signals on the information signal recording section.

When ejecting the disc cartridge after termination of the recording/reproducing operation, the magnetic plate 6 of the hub structure 3 is separated away from the magnet of the disc table so as to be taken out of the disc cartridge loading section. The operating force of separating the magnetic plate 6 from the magnet operates in a direction in which the outer rim fitting member 9 of the hub structure 3, bonded to the disc substrate 2 by the adhesive, tends to be separated away from each other.

Since the hub structure 3 is assembled to the clamping member 4 with the disc substrate 2 clamped in-between, the operating force produced at the time of inserting or detaching the disc cartridge into or away from the recording/reproducing apparatus acts for thrusting the disc substrate 2 onto the hub structure 3 via the clamping member 4. Thus there is no risk of the hub structure 3 being detached from the disc substrate 2 on repeated mounting and detachment of the optical disc 1 relative to the disc table of the disc rotating device.

In the above-described embodiment of the optical disc 1, the ring-shaped inner rim fitting member 8 is unified by outsert molding to the center opening in the magnetic plate 6. However, the present invention may also be applied to an optical disc in which the inner rim fitting member 8 is not employed. For example, in an optical disc for the recording/reproducing apparatus in which a spindle shaft is not protruded on the disc table of the disc rotating device, the inner rim fitting member is not required since the inner rim portion of the outer rim fitting member is responsible for positioning during loading.

What is claimed is:

1. A disc-shaped recording medium with hub structure comprising:

a disc substrate having an information signal recording section for recording information signals and having a center aperture;

said hub structure having a magnetic plate for being magnetically clamped to a disc table of a recording/reproducing apparatus by magnetic attracting means and an outer rim fitting member of a synthetic resin having a diameter slightly larger than an inner diameter of the center aperture of the disc substrate, said outer rim fitting member being combined integrally with an outer periphery of said magnetic plate, said outer rim fitting member having more than one group of elastically flexible engagement pieces at positions facing said center aperture, said hub structure being mounted on the disc substrate by being fitted in said center aperture from a major surface of the disc substrate and by having an inner surface of the outer rim fitting member coupled to an outer periphery of the center aperture; and a clamping member formed of an elastic material as a ring of a diameter slightly larger than the inner diameter of the center aperture of the disc substrate so as to exhibit elasticity along its thickness, said clamping member being integrally formed with a plurality of engagement pieces and positioning lugs, said clamping member being assembled from an opposite major surface of the disc substrate;

said hub structure and the clamping member being unitarily assembled together by connecting one of said groups of engagement pieces of the outer rim fitting member with said engagement pieces provided in the clamping member and by connecting another of said groups of engagement pieces of the outer rim fitting member with said positioning lugs provided in the clamping member, with the clamping member being flexed elastically to a small extent along its thickness.

2. The disc-shaped recording medium with hub structure as claimed in claim 1, wherein a ring-shaped inner rim fitting member of synthetic resin of high lubricating properties and high resistance against abrasion having a spindle shaft opening passed through by a spindle shaft of a disc rotating device of a recording/reproducing apparatus is unified to the magnetic plate of the hub structure.

3. The disc-shaped recording medium with hub structure as claimed in claim 1, further comprising guide means when assembling the hub structure and the clamping member in position to each other including plural positioning recesses in the outer rim fitting member in registration with the positioning lugs of the clamping member.

4. The disc-shaped recording medium with hub structure as claimed in claim 3, wherein the positioning recesses are formed at equiangular positions around a center aperture of the outer rim fitting member and wherein said positioning lugs are formed by bending at least three different circumferential points around a center aperture of the clamping member.

5. The disc-shaped recording medium with hub structure as claimed in claim 1, wherein plural mounting openings formed facing a center aperture of the outer rim fitting member, plural screw-inserting holes formed in the clamping member in registration with these mounting openings and plural set screws introduced via these screw-inserting holes into said mounting openings make up second coupling means;

said hub structure and the clamping member being reinforced by these second coupling means in the unitary mounting state thereof provided by engagement between the engagement pieces of the outer rim fitting member and the engagement pieces of the clamping member.

6. A disc-shaped recording medium with hub structure as claimed in claim 1, wherein said outer rim fitting member of said hub structure is formed of a synthetic resin material capable of transmitting UV rays.

7. A disc-shaped recording medium with hub structure as claimed in claim 6, wherein said synthetic resin material is a transparent polycarbonate resin.

8. A disc-shaped recording medium with hub structure as claimed in claim 1, wherein said more than one group of elastically flexible engagement pieces of said outer rim fitting member together delimit an outer peripheral annular wall of said hub structure.

9. A disc-shaped recording medium with hub structure as claimed in claim 1, wherein said hub structure and clamping member are unitarily bonded together using a UV curable adhesive.

10. A disc-shaped recording medium with hub structure as claimed in claim 1, wherein said more than one group of elastically flexible engagement pieces of said outer rim fitting member of said hub structure includes a first block group and a second block group, members of said first block group each having a smaller circumferential length than members of said second block group.

11. A disc-shaped recording medium with hub structure as claimed in claim 1, wherein members of one of said more than one group of elastically flexible engagement pieces each have a wedge-shaped protrusion having an inclined surface and a step contiguous to the inclined surface and are adapted for being engaged with said engagement pieces of said clamping member.

12. A disc-shaped recording medium with hub structure as claimed in claim 1, wherein members of one of said more than one group of elastically flexible engagement pieces each have a block-shaped protrusion on their inner peripheral side and are adapted for being engaged with said positioning lugs of said clamping member.

13. A disc-shaped recording medium with hub structure as claimed in claim 1, wherein said more than one group of elastically flexible engagement pieces of said outer rim fitting member of said hub structure includes a first block group and a second block group, members of said first block group each having a smaller circumferential length than members of said second block group; and wherein members of said first block group each have a wedge-shaped protrusion having an inclined surface and a step contiguous to the inclined surface and are adapted for being engaged with said engagement pieces of said clamping member.

14. A disc-shaped recording medium with hub structure as claimed in claim 1, wherein said more than one group of elastically flexible engagement pieces of said outer rim fitting member of said hub structure includes a first block group and a second block group, members of said first block group each having a smaller circumferential length than members of said second block group; and wherein members of said second block group each have a block-shaped protrusion on their inner peripheral side and are adapted for being engaged with said positioning lugs of said clamping member.

15. A disc-shaped recording medium with hub structure as claimed in claim 1, wherein said more than one group of elastically flexible engagement pieces of said outer rim fitting member of said hub structure includes a first block group and a second block group, members of said first block group each having a smaller circumferential length than members of said second block group;

wherein members of first block group each have a wedge-shaped protrusion having an inclined surface and a step contiguous to the inclined surface and are adapted for being engaged with said engagement pieces of said clamping member; and wherein members of said second block group each have a block-shaped protrusion on their inner peripheral side and are adapted for being engaged with said positioning lugs of said clamping member.

* * * * *